(12) United States Patent
Osman-Ponchet et al.

(10) Patent No.: US 10,705,004 B2
(45) Date of Patent: Jul. 7, 2020

(54) DIFFUSION CELL AND USES FOR EVALUATING THE DIFFUSION OF A COMPOUND THROUGH A MEMBRANE

(71) Applicant: GALDERMA RESEARCH & DEVELOPMENT, Biot (FR)

(72) Inventors: Hanan Osman-Ponchet, Antibes (FR); Laurent Fredon, Roquefort-les-Pins (FR); Christophe Jacques Louis Bianchi, Nice (FR)

(73) Assignee: GALDERMA RESEARCH & DEVELOPMENT, Biot (FR)

( * ) Notice: Subject to any disclaimer, the term of this patent is extended or adjusted under 35 U.S.C. 154(b) by 200 days.

(21) Appl. No.: 15/765,198

(22) PCT Filed: Sep. 30, 2016

(86) PCT No.: PCT/FR2016/052506
§ 371 (c)(1),
(2) Date: Mar. 30, 2018

(87) PCT Pub. No.: WO2017/055769
PCT Pub. Date: Apr. 6, 2017

(65) Prior Publication Data
US 2018/0275039 A1    Sep. 27, 2018

(30) Foreign Application Priority Data
Oct. 1, 2015 (FR) .................................. 15 59325
Mar. 8, 2016 (FR) .................................. 16 51923

(51) Int. Cl.
*G01N 15/08* (2006.01)
*G01N 13/00* (2006.01)
*B01L 3/00* (2006.01)

(52) U.S. Cl.
CPC ......... *G01N 15/0806* (2013.01); *G01N 13/00* (2013.01); *G01N 15/082* (2013.01); *B01L 3/50* (2013.01); *G01N 2013/003* (2013.01)

(58) Field of Classification Search
CPC .......... B01L 3/50; G01N 13/00; G01N 15/00; G01N 15/08; G01N 15/0806; G01N 15/082; G01N 33/00; G01N 2013/003
See application file for complete search history.

(56) References Cited

U.S. PATENT DOCUMENTS 4,594,884 A * 6/1986 Bondi ..................... G01N 13/00
                                                          210/321.84
4,771,004 A * 9/1988 Higuchi ............. G01N 33/5088
                                                          424/DIG. 7

(Continued)

FOREIGN PATENT DOCUMENTS

WO    2013/057401 A1    4/2013

OTHER PUBLICATIONS

International Search Report and Written Opinion of the International Searching Authority dated Dec. 8, 2016 corresponding to International Patent Application No. PCT/FR2016/052506, 12 pages.

(Continued)

*Primary Examiner* — Nguyen Q. Ha
(74) *Attorney, Agent, or Firm* — Foley & Lardner LLP; Sunit Talapatra

(57) ABSTRACT

A diffusion cell is described that includes a receiver compartment and a tightening ring intended to be positioned above the receiver compartment in such a way that a membrane sample, such as a sample of a skin, can be arranged between the receiver compartment and the tightening ring. The cell further includes means for tightening by rotation of the tightening ring on the receiver compartment. Uses of such a diffusion cell, in particular for evaluating the penetration capacity of a compound of interest contained in (Continued)

an aerosol formulation, are also described. These uses can be applicable in an occlusive patch or semi-occlusive patch or in a formulation under occlusive or semi-occlusive conditions in the skin. The uses can also be implemented to evaluate the capacity of an aerosol formulation, an occlusive or semi-occlusive patch or a formulation under occlusive or semi-occlusive conditions to deliver a compound of interest through the skin.

17 Claims, 3 Drawing Sheets

(56) References Cited

U.S. PATENT DOCUMENTS

| | | | | |
|---|---|---|---|---|
| 5,131,261 | A * | 7/1992 | Tou | G01N 15/08 73/38 |
| 6,521,191 | B1 * | 2/2003 | Schenk | G01N 13/00 422/547 |
| 8,322,193 | B2 * | 12/2012 | Castro | G01N 13/04 73/38 |
| 2005/0019903 | A1 * | 1/2005 | Yang | G01N 13/00 435/288.2 |
| 2005/0063862 | A1 | 3/2005 | Roscoe et al. | |
| 2009/0075323 | A1 * | 3/2009 | Yang | G01N 13/00 435/29 |
| 2010/0223979 | A1 * | 9/2010 | Ploehn | G01N 15/0826 73/38 |
| 2012/0324984 | A1 * | 12/2012 | Wakefield | G01N 3/12 73/38 |

OTHER PUBLICATIONS

Franz, T.J., "Percutaneous Absorption. On the Relevance of In Vitro Data," Journal of Investigative Dermatology, vol. 64, No. 3, Mar. 1975, pp. 190-195, XP003002651.

* cited by examiner

State of the art

DIFFUSION CELL AND USES FOR EVALUATING THE DIFFUSION OF A COMPOUND THROUGH A MEMBRANE

CROSS-REFERENCE TO PRIOR APPLICATIONS

This application is a National Stage of PCT/FR2016/052506 filed Sep. 30, 2016, and designating the United States (published on Apr. 6, 2017, as WO 2017/055769 A1), which claims priority under 35 U.S.C. § 119 to French Application No. 1559325, filed Oct. 1, 2015, and French Application No. 1651923, filed Mar. 8, 2016, each hereby expressly incorporated by reference in its entirety and each assigned to the assignee hereof.

FIELD

The invention relates to a novel diffusion cell and its uses, in particular for analysing a composition in aerosol formulation or in patch form. The invention has applications especially in the cosmetics, pharmaceuticals and veterinary fields, for evaluating the skin penetration and permeation of a compound of interest.

BACKGROUND

The study of a compound's diffusion through the skin, or percutaneous penetration, is an important step in the development process of a cosmetic, pharmaceutical or veterinary composition. Indeed, such a study makes it possible, amongst other things, to evaluate the absorption, the distribution and the tissue elimination of said compound. These characteristics also depend on the ingredients and on the form (liquid, solid, semi-solid, gel, gas, etc.) of the composition chosen for the administration of said compound. It is thus important that these additional parameters can be taken into account during the diffusion study.

SUMMARY

Currently, one of the leading methods for evaluating the percutaneous penetration of a compound of interest is the Franz cell diffusion method (Franz T. J., J Invest Dermatol, 64: 190-195; 1975). An example of a Franz cell is represented schematically in FIG. 1. Such a vertical cell 1 traditionally comprises a donor compartment 2, separated from a receptor compartment 3 by a membrane 4, such as a skin sample. In order to ensure that the device is sealed, a clip 6 is placed between the donor compartment 2 and the receptor compartment 3, the membrane 4 acting as an O-ring. The donor compartment 2 receives the formulation containing the compound to be studied. The receptor compartment 3 contains a solution for collecting what percolates through the skin sample. A sampling port 5 allows samples of the solution to be taken at regular intervals for analysis, in order to assay the molecules which crossed the membrane 4.

Such a configuration is particularly suited to the analysis of liquid, solid, semi-solid or gel compositions, which are easily deposited in the donor compartment. Conversely, it is not possible to directly analyse a composition packaged as aerosol, i.e., a composition intended to be diffused by a gas in the form of generally microscopic (smaller than 50 μm), solid or liquid particles. Indeed, the effective membrane area in a Franz cell is usually about 1 to 2 cm². It is thus not possible to vaporize with precision a given quantity of the composition on said membrane. These compositions are generally repackaged in liquid form so as to be able to be deposited on the membrane. This repackaging modifies the usage conditions of the composition and may also dilute the compound to be detected and/or assayed. Neither does such repackaging allow reliable evaluation of the percutaneous penetration of an aerosol composition.

In order to be able to directly analyse the diffusion of a compound of interest in a composition packaged as aerosol, the effective membrane area must be at least tripled. But simply increasing the dimensions of the diffusion cell would lead to numerous problems, in terms of sealing and of the reliability of the results. Indeed, the thickness of the membrane sample, such as a skin sample, cannot be uniform over the entire effective area, leading to risks of loss of sealing in direct proportion to the surface area of the skin. Moreover, the parallel increase in receptor compartment volume can be detrimental, especially during analysis of compounds with low penetration.

There also exist diffusion cells whose donor and receptor compartments are in the form of multi-well plates, the membrane being sandwiched between the two plates. This configuration allows the use of a large membrane area. It is unsatisfactory, however, for evaluating the diffusion of a compound in an aerosol composition. Indeed, during the vaporization of such a composition on the membrane, it is not possible to know the exact amount received at each well. Moreover, certain portions of the membrane which receive aerosol droplets are not opposite a well.

There thus exists today no satisfactory device for reliably analysing the percutaneous penetration of a compound of interest contained in a composition in aerosol form, or in any form requiring a large membrane area.

The objective of the invention is to solve the abovementioned problem by proposing a preferentially vertical diffusion cell, the dimensions of which can be adapted to provide an effective membrane area allowing direct analysis of compositions packaged as aerosol, hereinafter aerosol formulations. Importantly, the diffusion cell according to the invention has a system for holding the membrane sample in position, which allows it to be adapted to different membrane thicknesses. Thus, the dimensions of the cell can be increased relative to the dimensions of the current diffusion cells without prejudice to the sealing of the whole. In order to limit the volume of the receptor compartment, the diffusion cell according to the invention can in addition have a generally longitudinally truncated conical shape.

The invention thus relates to a diffusion cell comprising a receptor compartment for containing a receptor medium, a clamping ring to be positioned over the receptor compartment so that a membrane sample can be disposed between the receptor compartment and the clamping ring, and clamping means by rotation of the clamping ring on the receptor compartment, said clamping means comprising:

at least two inclined clamping projections on an outer periphery of the receptor compartment; and at least two clamping housings having a shape complementary to the inclined clamping projections, on an outer periphery of the clamping ring, or vice versa, said inclined clamping projections each being able to be locked into a clamping housing by rotation of the clamping ring relative to the receptor compartment.

In the context of the invention, "diffusion cell" refers to a device for any type of analysis in or through a membrane, whether biological or not, and especially for analysis of the penetration of a compound of interest in or through a membrane.

The expression "compound" or "compound of interest" is used to refer to a natural or synthetic molecule, or a set of molecules, as well as a biological substance such as a virus, a toxin, cell debris, etc., in a composition or formulation.

The expression "formulation" is used to refer to any type of liquid, solid, semisolid or gel composition, which is easily deposited in the donor compartment.

The clamping ring according to the invention advantageously has a generally disc shape with a central opening. The central opening faces the receptor compartment when the ring is in position on said compartment. The ring advantageously has a flat bearing surface for contacting a membrane sample disposed between the receptor compartment and said ring.

The clamping means according to the invention are distributed on the receptor compartment and the clamping ring, so that it is no longer necessary to employ clips or other additional elements to hold the system together. More precisely, the clamping means comprise clamping projections and complementary clamping housings. According to the invention, the clamping projections can be disposed on the clamping ring and the clamping housings on the receptor compartment, or vice versa. Thus, once the clamping ring is positioned on the receptor compartment, a simple rotation of said ring relative to said receptor compartment brings the clamping projections into the clamping housings, which locks the clamping ring in position on the receptor compartment.

The clamping projections extend radially on an outer periphery, or outer contour, of the receptor compartment or the clamping ring. Thus, they form projections which protrude from the body on which they are carried and can fit into the complementary shaped clamping housings, also on the outer periphery of the body on which they are carried.

In a particular embodiment, the clamping projections extend radially on an outer periphery of the receptor compartment and the receptor housings are arranged on an outer periphery of the clamping ring.

In order to take into account potential variations in thickness from one membrane sample to another, the clamping projections are inclined. The clamping housings also have an inclined opening, so as to be able to receive the clamping projections in their entirety. As a function of the thickness of the membrane disposed between the receptor compartment and the clamping ring, the clamping projections penetrate into the clamping housings to a greater or lesser extent. The thicker the membrane, the lesser the clamping projections are fitted into the clamping housings, and vice versa. In all cases, the clamping ring is held in position on the receptor compartment, and the membrane, flattened between the bearing surface of the ring and the receptor compartment, can act as an O-ring. Advantageously, the diffusion cell according to the invention can be used with a membrane sample having a thickness ranging between 0.5 and 10 mm, preferentially between 1 and 5 mm.

Advantageously the clamping projections are inclined with a slope ranging between 1° and 45°, preferentially between 10° and 30°. In the context of the invention, the slope refers to the incline of the projection relative to the flange, i.e., the angle formed between the plane of the projection and the plane of the flange. The slope can be easily adapted according to the nature of the membrane to be used.

In order to distribute the clamping zones and to guarantee that the clamping ring is held correctly on the receptor compartment and that the system is well sealed, it is possible to anticipate three, four or more pairs of inclined clamping projections/complementary clamping housings. Advantageously, the projections and housings are distributed regularly on the outer periphery of the receptor compartment and of the clamping ring. In a particular example, the diffusion cell comprises four pairs of clamping projections/clamping housings.

In a particular embodiment, a flange extends radially towards the outside from an upper end of the receptor compartment. The flange on the receptor compartment forms a flat bearing surface opposite the bearing surface of the clamping ring. Thus, in operation, an outer contour of the membrane sample is clamped between the bearing surface of the flange on the receptor compartment and the bearing surface of the clamping ring. The centre of the membrane sample is opposite the central opening of the clamping ring and opposite the receptor compartment, thus defining an effective membrane area.

Advantageously, the receptor compartment, the clamping ring and the clamping means are made of plastic material. In a particular embodiment the receptor compartment is made of polycarbonate and the clamping ring is made of polytetrafluoroethylene. In another embodiment, the clamping ring and the clamping means are made of polytetrafluoroethylene. The diffusion cell can thus be obtained in particular by moulding, 3D printing, etc. Such a diffusion cell can be easily cleaned and sterilized for reuse as needed. Otherwise, it can be disposable.

In a particular embodiment, the diffusion cell comprises a receptor compartment with a diameter ranging between 3 and 5 cm and a volume ranging between 5 and 25 mL. The effective membrane area when a membrane sample is positioned between the ring and the receptor compartment is thus between 7 and 20 cm$^2$, ±0.5. By "effective membrane area" is meant the area of the membrane that will be positioned over the receptor medium and that will receive the composition sample to be analysed. For example, the receptor compartment has a diameter of 4 cm and a volume of 18 mL. The clamping ring, like the flange, thus advantageously has a diameter of 6 cm±0.5, the diameter of the central opening being 4 cm. The effective membrane area is thus about 12.5 cm$^2$, ±0.5. A diffusion cell with such dimensions, and especially which provide an effective area greater than 7 cm$^2$, is particularly suited to the analysis of compounds or active ingredients contained in an aerosol formulation. The aerosol formulation can indeed be vaporized with precision on the membrane sample. Of course, the diffusion cell according to the invention can also be used for the analysis of compositions in liquid, solid, gel or ointment form, etc. To that end, it suffices to deposit a sample of the composition, for example a drop of liquid composition, on the effective membrane area. Such a diffusion cell is also particularly suited to the analysis of compounds whose penetration is increased by the application of an electric current through the membrane, in particular by electrical stimulation or iontophoresis. Indeed, the dimensions of the cell according to the invention allow the application not only of the composition of interest on the effective area of the membrane, but they can also be adapted to the size requirements of an electrical stimulation or iontophoresis device, applied to said effective area in order to send current through the membrane. Advantageously, such an electrical stimulation or iontophoresis device is in the form of a patch which is placed directly on the effective area of the membrane, a part of said device which can be pinched between the membrane and the clamping ring of the diffusion cell. An exemplary electrical stimulation or iontophoresis device that can be used with the diffusion cell according to the invention is described in application WO2014/108548.

In a particular embodiment, the receptor compartment has a generally conical shape with, in its height, a flat face. In other words, a section of the cone is cut by a plane perpendicular to the base. Thus, for a given height, the volume of the compartment is reduced relative to a compartment of generally cylindrical, or even simply conical, shape. By "height" is meant the dimension extending vertically relative to the base of the cone.

In an embodiment, the diffusion cell comprises a sampling port extending from a base of the receptor compartment, said sampling port being in fluid communication with said receptor compartment. The sampling port makes it possible to take, each time that is necessary, an aliquot of the receptor medium contained in the receptor compartment, in particular for analytical purposes. It can also make it possible to reintroduce volumes of receptor medium into the receptor compartment as needed.

The invention also relates to the use of a diffusion cell as described above, fitted with a membrane sample, to measure the capacity of a compound of interest contained in an aerosol formulation to penetrate the skin and/or to measure the capacity of an aerosol formulation to deliver a compound of interest through the skin.

The invention also relates to the use of a diffusion cell as described above, fitted with a membrane sample, to measure the skin penetration capacity of a compound of interest contained in an occlusive or semiocclusive patch.

The invention also relates to the use of a diffusion cell as described above, fitted with a membrane sample, to measure the skin penetration capacity of a compound of interest contained in a formulation under occlusive or semiocclusive conditions.

The invention also relates to the use of a diffusion cell as described above, fitted with a membrane sample, to measure the skin penetration capacity of a compound of interest contained in a composition, said penetration being stimulated by electrical stimulation or iontophoresis, in particular by means of an iontophoresis device. The composition is thus advantageously in gel or patch form.

The invention also relates to a method for evaluating the capacity of a compound of interest contained in an aerosol formulation to penetrate the skin and/or the capacity of an aerosol formulation to deliver a compound of interest through the skin by means of a diffusion cell as described above, comprising the steps consisting in:
positioning a membrane sample over the receptor medium of the receptor compartment;
placing the clamping ring on the membrane sample;
rotating the clamping ring so as to lock the clamping projections into the corresponding clamping housings so that the membrane sample is held over the receptor medium;
vaporizing the aerosol formulation on the membrane sample;
analysing at least one sample of the receptor medium.

The invention also relates to a method for evaluating the skin penetration capacity of a compound of interest contained in an occlusive or semiocclusive patch by means of a diffusion cell as described above, comprising the steps consisting in:
positioning an occlusive or semiocclusive patch comprising a compound of interest on a membrane sample;
disposing the membrane sample/occlusive or semiocclusive patch unit over the receptor medium of the receptor compartment;
placing the clamping ring on the membrane sample;
rotating the clamping ring so as to lock the clamping projections into the corresponding clamping housings so that the membrane sample is held over the receptor medium;
analysing at least one sample of the receptor medium.

The occlusive or semiocclusive patch is advantageously directed towards the outside of the receptor compartment. The membrane sample on which the compound of interest is applied, regardless of the application method, is advantageously held in position over the receptor compartment for a period of time ranging between 1 minute and 48 hours, before the analysis, in particular between 1 hour and 24 hours. The person skilled in the art knows, as a function of the nature of the compound of interest and of the preparation containing same, the appropriate application time before analysis.

The invention also relates to a method for evaluating the capacity of a compound of interest contained in a formulation to penetrate the skin and/or the capacity of a formulation to deliver a compound of interest under occlusive or semiocclusive conditions through the skin by means of a diffusion cell as described above, comprising the steps consisting in:
positioning a membrane sample over the receptor medium of the receptor compartment;
placing the clamping ring on the membrane sample;
rotating the clamping ring so as to lock the clamping projections into the corresponding clamping housings so that the membrane sample is held over the receptor medium;
applying the formulation to the membrane sample;
positioning an occlusive or semiocclusive device over the formulation and in contact with the latter;
analysing at least one sample of the receptor medium.

The invention also relates to a method for evaluating the skin penetration capacity of a compound of interest contained in a composition, said penetration being stimulated by iontophoresis or electrical stimulation, by means of a diffusion cell as described above, comprising the steps consisting in:
positioning a composition sample comprising a compound of interest on a membrane sample;
disposing the membrane sample unit over the receptor medium of the receptor compartment;
disposing a part of an electrical stimulation or iontophoresis device, bearing an electrode system, on the composition sample;
placing the clamping ring on the membrane sample;
rotating the clamping ring so as to lock the clamping projections into the corresponding clamping housings so that the membrane sample and the part of the electrical stimulation or iontophoresis device bearing the electrode system are held over the receptor medium;
applying a voltage to the membrane sample by means of the electrical stimulation or iontophoresis device;
analysing at least one sample of the receptor medium.

Alternatively, the membrane sample can be disposed over the receptor medium of the receptor compartment before the composition is deposited on the effective membrane area.

Advantageously, the part of the electrical stimulation or iontophoresis device bearing the electrode system is in patch form. A voltage generator is connected to the part of the electrical stimulation or iontophoresis device bearing the electrode system so as to send a low-intensity current through the membrane. Advantageously, the applied current is between 1 and 2 mA, preferentially about 1.5 mA.

The cell according to the invention can be used with any type of membrane and especially with a biological membrane, such as epithelium, endothelium, connective tissue, etc., but also with artificial or synthetic membranes.

BRIEF DESCRIPTION OF THE DRAWINGS

The invention will be better understood by reading the following description and by examining the accompanying figures. These are presented for information only and in no way limit the invention. The figures represent.

DETAILED DESCRIPTION

FIGS. 2 to 5 illustrate an exemplary embodiment of a diffusion cell 10 according to the invention.

Figure 1:
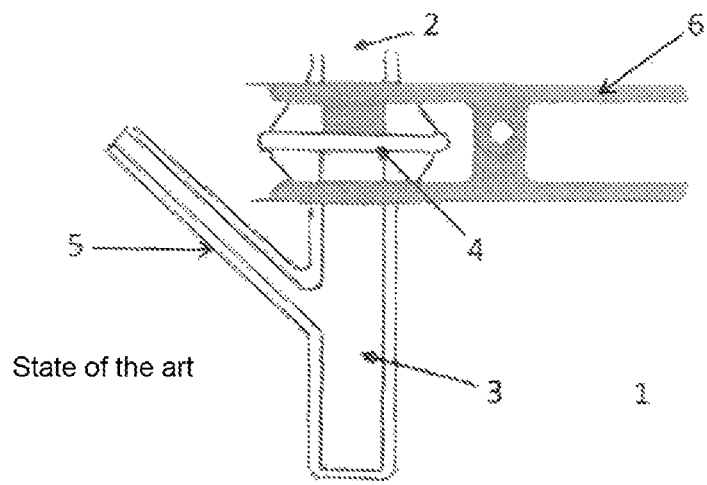
FIG. 1: a schematic representation of a diffusion cell of the state of the art, already described.
Figure 2:
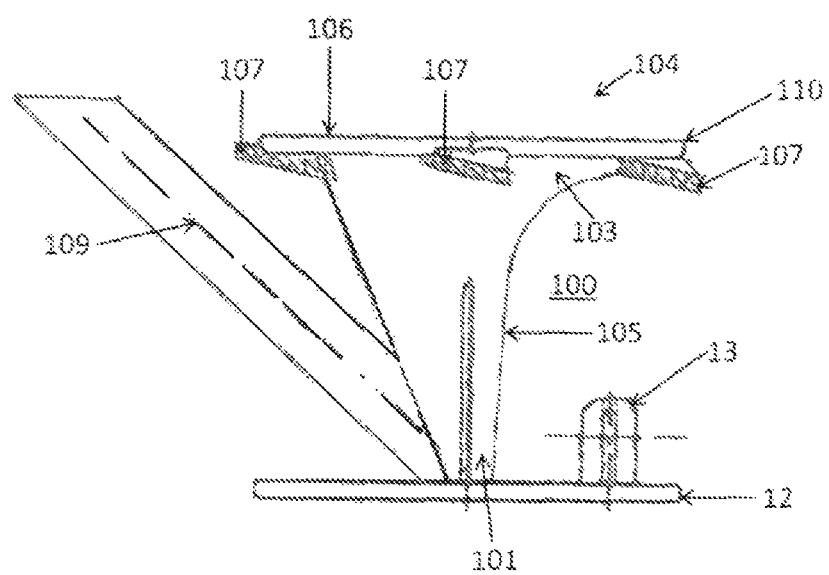
FIG. 2: a side view of a receptor compartment of a diffusion cell according to an embodiment of the invention.
Figure 3:
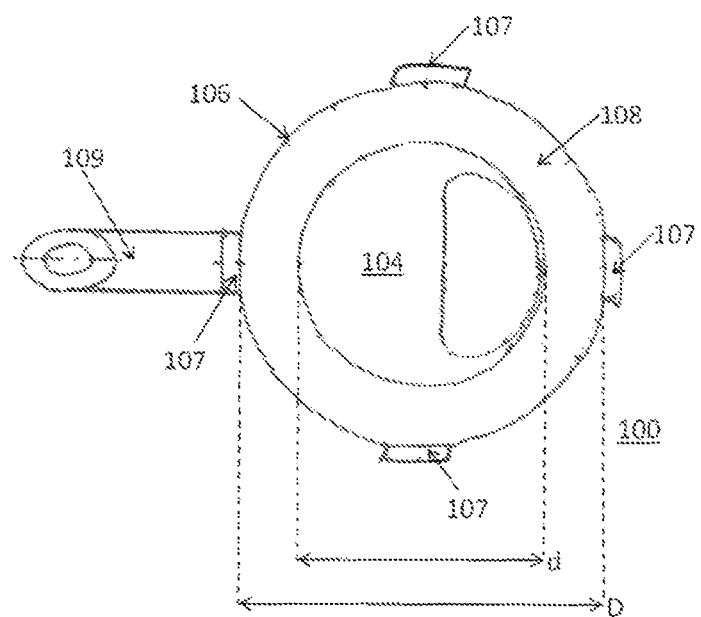
FIG. 3: a top view of the receptor compartment of FIG. 2.

In FIGS. 2 and 3 is represented a receptor compartment 100 having a generally inverted cone shape. More precisely, the vertex 101 of the cone is integral with a base 12 of the diffusion cell, the base 103 of the cone providing an opening 104 of the receptor compartment 100 to be covered by a membrane sample (not shown). In the example shown, the cone formed by the receptor compartment 100 is a truncated cone. More precisely, the cone has a flat face 105, which reduces the internal volume of the receptor compartment 100 relative to the volume of a nontruncated cone of the same dimensions (height, radius). Of course, as a function of the experimental conditions in which the diffusion cell is to be used, and especially as a function of the compound to be studied, it is possible to modify the flat face 105, so as to obtain a larger, or conversely a smaller, volume of the receptor compartment 100. It is also possible to use a receptor compartment 100 having a nontruncated conical shape. Similarly, the receptor compartment can have a generally cylindrical shape, whether truncated or not, tubular shape, etc. The person will be able, as a function of use for which the diffusion cell is intended, to adapt the shape of the receptor compartment to the desired volume of receptor medium.

In a particular example, the diameter of the cone 105, corresponding to the diameter d of the opening 104 of the receptor compartment 100, is about 4 cm, for a cone height of about 5 cm and a flat face such that the volume of the receptor compartment 100 is 18 mL, ±0.5.

A flange 106 extends radially towards the outside from an outer periphery of the upper end, or base 103, of the receptor compartment 100. The flange 106 provides a continuous, flat, ring shaped bearing surface 108 on the entire outer periphery of the receptor compartment 100. For example, the flange has an outer diameter D ranging between 5 and 7 cm, and in particular an outer diameter of 6 cm, ±5. Thus, the bearing surface 108 has a surface about 1 cm wide all the way around the opening 104 of the receptor compartment 100.

Clamping projections 107 form isolated protuberances from the outer periphery 110 of the flange 106. In the example shown, four clamping projections 107 extend in projection from the outer periphery 110 of the flange 106. Of course, it is possible to envisage a lower or higher number of clamping projections 107. The number of projections 107, which should not be lower than two, can vary as a function of the dimensions of the diffusion cell and of the surface area of the associated membrane sample. The person skilled in the art will be able to adapt the number of clamping projections 107 to enable the satisfactory retention of the membrane sample and to guarantee the sealing of the whole.

Figure 4:
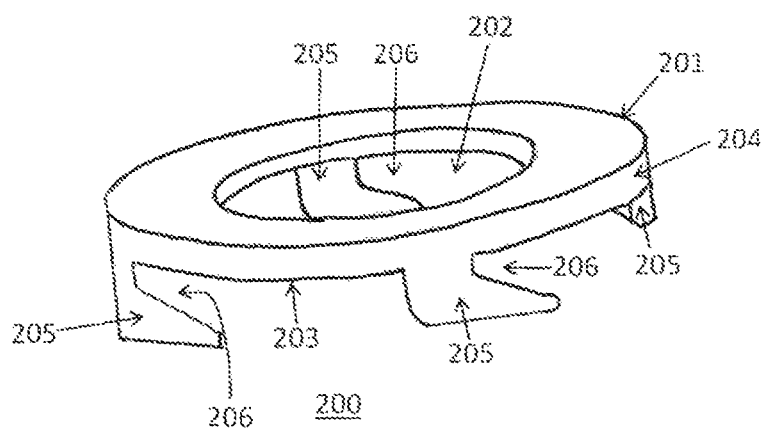
FIG. 4: a perspective view of a clamping ring of a diffusion cell according to an embodiment of the invention, particularly adapted to the receptor compartment of FIGS. 2 and 3.

As explained above, the clamping projections 107 are inclined, in the sense that they extend at an angle from the base 12 of the diffusion cell 10. The slope of the clamping projections 107 can vary as a function of the membrane thicknesses to be accepted. In the example shown, the slope is about 15°. The clamping projections 107 thus form inclined planes that can engage the complementary-shaped clamping housings on a clamping ring (FIG. 4).

Conventionally, a sampling port 109 extends from the base of the receptor compartment 100, corresponding to the vertex 101 of the cone, in fluid communication with the internal volume of the receptor compartment 100. Thus, it is possible to take at leisure samples of receptor medium. It is also possible to fill as needed the receptor compartment with receptor medium, by means of this sampling port 109. Of course, the diffusion cell 10 may have no sampling port, or conversely may comprise several. Otherwise, it may comprise any other means for taking samples of receptor medium without disturbing the experiment in progress.

In order to stabilize the receptor compartment 100, an upright support 13 is provided on the base 102 of the diffusion cell 10, capable of receiving a stabilization weight. The upright support 13 is advantageously diametrically opposite the sampling port 109 (FIGS. 2 and 5).

The diffusion cell 10 further comprises a clamping ring 200 (FIG. 4) designed to cooperate with the receptor compartment 100 in order to hold a membrane sample over said receptor compartment 100.

Figure 5:
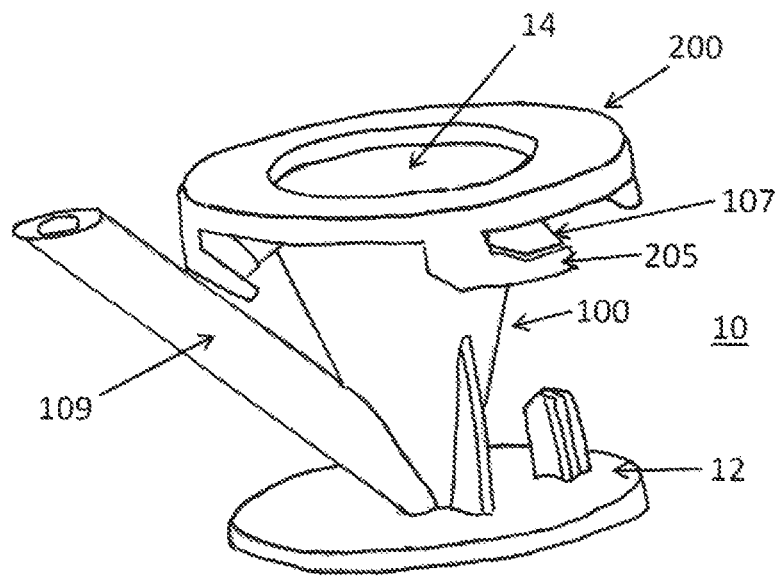
FIG. 5: a perspective view of a diffusion cell according to an exemplary embodiment of the invention.

The clamping ring 200 is in the shape of a flattened ring 201 with a central opening 202 to coincide with the opening 104 of the receptor compartment 100 once in position (FIG. 5). More precisely, a lower flat bearing surface 203 of the ring 201 is to be superposed on the bearing surface 108 on the receptor compartment 100. Advantageously, the dimensions of the two bearing surfaces 108, 203 are identical. Thus, there is a perfect superposition of the flange 106 and of the ring 201, with no reduction of the diameter of the opening 104 of the receptor compartment 100. The diameter d of the opening 104 of the receptor compartment 100 thus corresponds to the inner diameter of the clamping ring 200 and to the diameter of the effective area 14 of the membrane in position in the diffusion cell 10.

An outer periphery 204 of the ring 201 supports legs 205 extending vertically downwards from said outer periphery 204. Each leg 205 comprises an opening 206, forming a clamping housing, for receiving a clamping projection 107 of the receptor compartment 100. Thus, when the clamping ring 200 is positioned on the receptor compartment 100 so that the opening 104 of the receptor compartment 100 and the opening 202 of the clamping ring 200 are concentric, a rotation of said clamping ring 200 relative to the receptor compartment 100 fits the clamping projections 107 into the complementary clamping housings 206. In the example shown, the clamping ring 200 comprises four clamping housings 206 disposed so that once in position, each clamping housing 206 receives a clamping projection 107. Of course, the clamping ring 200 may comprise a larger or smaller number of clamping housings 206.

Such a diffusion cell 10 can advantageously be used for evaluating the capacity of a compound of interest contained in an aerosol formulation to penetrate the skin and/or for evaluating the capacity of an aerosol formulation to deliver a compound of interest through the skin. It is possible for example to position a membrane sample, such as a skin sample, having a diameter greater than the diameter of the opening 104 of the receptor compartment 100 over said opening 104. The opening 104 is thus sealed by the membrane. Advantageously, the membrane has a diameter substantially equal to the outer diameter of the flange 106. Thus, the bearing surface 108 of the flange 106 is covered by the membrane. The membrane is then covered with the clamping ring 200, so that the membrane is flattened between the bearing surface 108 of the flange 106 and the bearing surface 203 of the clamping ring 200. The clamping ring 200 is then turned relative to the receptor compartment 100 so as to engage the clamping projections 107 in the clamping housings 206. The rotation is continued to its maximum extent. The joint between the receptor compartment 100 and the clamping ring 200 is thus sealed, the membrane acting as an O-ring. It is then possible to vaporize the aerosol formulation on the effective area 14 of the membrane sample. If the diameter of the central opening 202 of the ring 201 is equal to the diameter of the opening 104 of the receptor compartment 100, the effective area 14 of the membrane corresponds to the membrane area disposed over said opening 104. One then proceeds in a conventional manner, by taking samples of receptor medium by means of the sampling port 109, for analysis.

Figure 6:
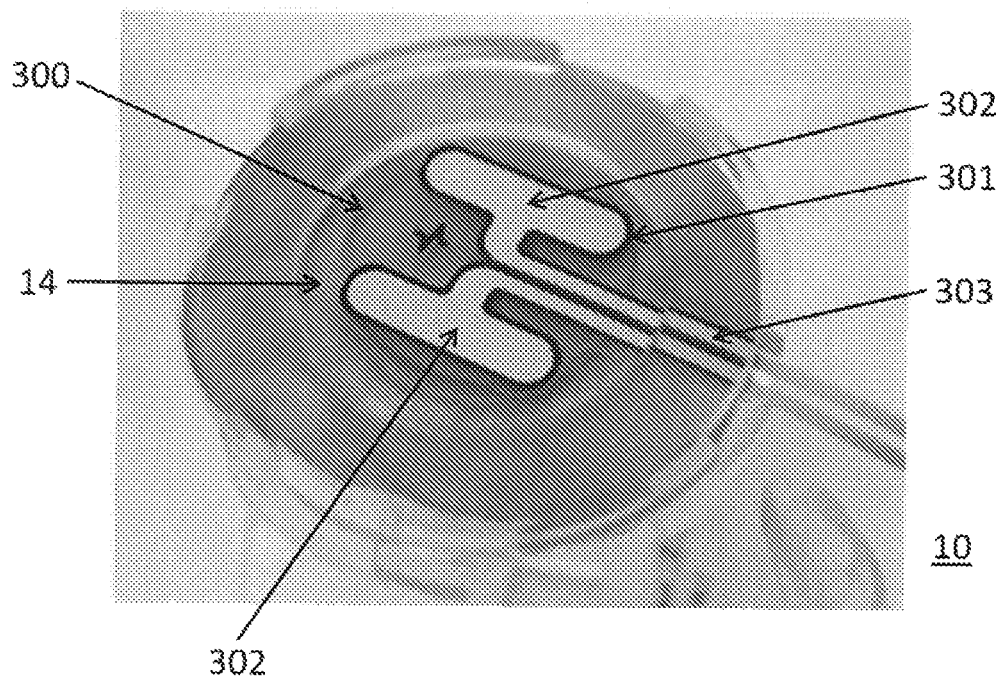
FIG. 6: a top view of a diffusion cell according to an exemplary embodiment of the invention bearing the electrodes of an iontophoresis device.

As is now described in reference to FIG. 6, the diffusion cell according to the invention has a particularly advantageous application when evaluating the penetration of a compound of interest for which said penetration is electrically stimulated.

FIG. 6 represents a partial top view of a diffusion cell 10 as previously described, on which a membrane sample 300 is mounted. A composition comprising a compound of interest is disposed on the effective area 14 of the membrane 300, and is covered with a patch 301 bearing the electrodes 302 of an iontophoresis device (partially shown). As can be seen in FIG. 6, the membrane sample 300 and a portion 303 of the electrodes 302 are clamped between the bearing surfaces of the ring 201 and the receptor compartment (not visible).

The clamping system of the diffusion cell according to the invention makes it easy to use such electrodes which are held by tight contact against the effective area of the membrane so as to target the membrane region receiving the current.

The invention claimed is:

1. A diffusion cell comprising a receptor compartment for containing a receptor medium, a clamping ring to be positioned over the receptor compartment so that a membrane sample can be disposed between the receptor compartment and the clamping ring, and a clamp that operates by rotation of the clamping ring on the receptor compartment, the clamp comprising
   at least two clamping projections inclined on an outer periphery of the receptor compartment; and
   at least two clamping housings having a shape complementary to the clamping projections, on an outer periphery of the clamping ring, or vice versa,
   each of the clamping projections being able to be locked into a clamping housing by rotation of the clamping ring relative to the receptor compartment.

2. The diffusion cell according to claim 1, wherein the clamping projections are inclined with a slope ranging from 1 to 45°.

3. The diffusion cell according to claim 1, comprising four inclined clamping projections and four complementary clamping housings regularly distributed on the outer periphery of the receptor compartment and of the clamping ring.

4. The diffusion cell according to claim 1, wherein a flange extends radially towards the outside of the receptor compartment, the flange forming a bearing surface for a membrane sample positioned over the receptor medium.

5. The diffusion cell according to claim 4, wherein the clamping projections project outward from an outer periphery of the flange.

6. The diffusion cell according to claim 1, wherein the receptor compartment, the clamping ring and the clamp are made of plastic material.

7. The diffusion cell according to claim 6, wherein the receptor compartment is made of polycarbonate and the clamping ring is made of polytetrafluoroethylene.

8. The diffusion cell according to claim 1, wherein the receptor compartment has a diameter (d) ranging from 3 cm to and 5 cm and a volume ranging from 5 mL and 25 mL.

9. The diffusion cell according to claim 8, wherein the diameter (d) is about 4 cm.

10. The diffusion cell according to claim 8, wherein the volume is about 18 mL.

11. The diffusion cell according to one claim 1, wherein the receptor compartment has a generally conical shape having a flat face.

12. The diffusion cell according to claim 1, further comprising a sampling port extending from a base of the receptor compartment, said sampling port being in fluid communication with the receptor compartment.

13. A method of measuring capacity of a compound of interest in an aerosol formulation to penetrate the skin and/or to measure the capacity of an aerosol formulation to deliver a compound of interest through the skin and/or to measure skin penetration capacity of a compound of interest contained in an occlusive or semi-occlusive patch, or in a formulation under occlusive or semiocclusive conditions and/or to measure skin penetration capacity of a compound of interest subjected to electrical stimulation or iontophoresis, the method comprising conducting such measurements using the diffusion cell according to claim 1.

14. A method for evaluating capacity of a compound of interest contained in an aerosol formulation to penetrate the skin and/or capacity of an aerosol formulation to deliver a compound of interest through the skin, the method comprising using the diffusion cell according to claim 1 in accordance with the following the steps:
   positioning a biological, artificial or synthetic membrane sample over the receptor medium of the receptor compartment;
   placing the clamping ring on the membrane sample;
   rotating the clamping ring so as to lock the clamping projections into the corresponding clamping housings so that the skin sample is held over the receptor medium;
   vaporizing the aerosol formulation containing the compound of interest on the membrane sample; and
   analyzing at least one sample of the receptor medium.

15. A method of evaluating the skin penetration capacity of a compound of interest contained in an occlusive or semi-occlusive patch, the method comprising using the diffusion cell according to claim 1 in accordance with the following steps:

disposing an occlusive or semi-occlusive patch comprising a compound of interest on a biological, artificial or synthetic membrane sample;

positioning the membrane sample/occlusive or semi-occlusive patch unit over the receptor medium of the receptor compartment;

placing the clamping ring on the membrane sample;

rotating the clamping ring so as to lock the clamping projections into the corresponding clamping housings so that the membrane sample is held over the receptor medium; and analyzing at least one sample of the receptor medium.

16. A method of evaluating capacity of a compound of interest contained in a formulation to penetrate the skin and/or capacity of a formulation to deliver a compound of interest under occlusive or semi-occlusive conditions through the skin, the method comprising using the diffusion cell according to claim 1 in accordance with the following steps:

positioning a membrane sample over the receptor medium of the receptor compartment;

placing the clamping ring on the membrane sample;

rotating the clamping ring so as to lock the clamping projections into the corresponding clamping housings so that the membrane sample is held over the receptor medium;

applying the formulation to the membrane sample;

positioning an occlusive or semi-occlusive device over the formulation and in contact with the latter; and analyzing at least one sample of the receptor medium.

17. A method of evaluating skin penetration capacity of a compound of interest contained in a composition, the penetration being stimulated by iontophoresis or electrical stimulation, the method comprising using the diffusion cell according to claim 1 in accordance with the following steps:

positioning a composition sample comprising a compound of interest on a membrane sample;

disposing the membrane sample unit over the receptor medium of the receptor compartment;

disposing a part of an electrical stimulation or iontophoresis device, bearing an electrode system, on the composition sample;

placing the clamping ring on the membrane sample;

rotating the clamping ring so as to lock the clamping projections into the corresponding clamping housings so that the membrane sample and the part of the electrical stimulation or iontophoresis device bearing the electrode system are held over the receptor medium;

applying a voltage to the membrane sample by means of the electrical stimulation or iontophoresis device; and analyzing at least one sample of the receptor medium.

* * * * *